United States Patent [19]

Kikuchi et al.

[11] Patent Number: 5,206,908
[45] Date of Patent: Apr. 27, 1993

[54] METHOD AND APPARATUS FOR DETECTING TIMING PULSES FOR SCRAMBLED TELEVISION SYSTEM

[75] Inventors: Ryuji Kikuchi; Nobuo Uee; Fujinori Ozawa; Tomonori Suzuki, all of Tokyo, Japan

[73] Assignee: Pioneer Electronic Corporation, Tokyo, Japan

[21] Appl. No.: 811,585

[22] Filed: Dec. 20, 1991

[30] Foreign Application Priority Data

Jan. 9, 1991 [JP] Japan .................................. 3-11615

[51] Int. Cl.$^5$ .............................................. H04N 7/167
[52] U.S. Cl. ........................................ 380/15; 380/19; 380/20
[58] Field of Search .................... 380/10, 15, 17, 19, 380/20

[56] References Cited

U.S. PATENT DOCUMENTS

| | | | |
|---|---|---|---|
| 4,458,268 | 7/1984 | Ciciora | 380/15 X |
| 4,567,517 | 1/1986 | Mobley | 380/15 |
| 5,091,935 | 2/1992 | Meriwether et al. | 380/15 |

Primary Examiner—Tod Swann
Attorney, Agent, or Firm—Sughrue, Mion, Zinn, Macpeak & Seas

[57] ABSTRACT

A method and apparatus for detecting timing pulses for descrambling a scrambled television signal, wherein a video IF signal and a sound IF signal are separated from a scrambled television IF signal by utilizing different filters, a local video carrier wave synchronized with the separated video IF signal is generated and is mixed with the separated sound IF signal for producing a beat signal, the timing pulses are detected by demodulating the main sound IF signal, and then descrambling the received scrambled television IF signal by stretching horizontal synchronizing intervals in accordance with stretch data obtained by decoding compression data contained the detected timing pulses, whereby the main sound IF signal is separated from the beat signal by attenuating the auxiliary sound IF signal with a bandpass filter.

8 Claims, 3 Drawing Sheets

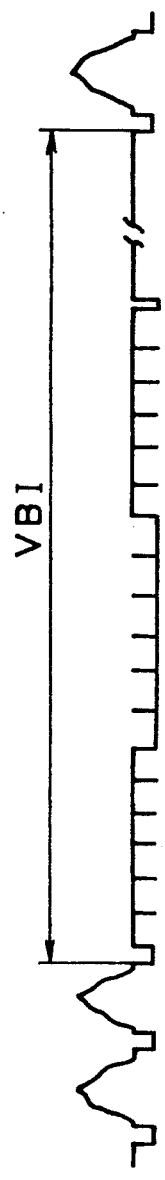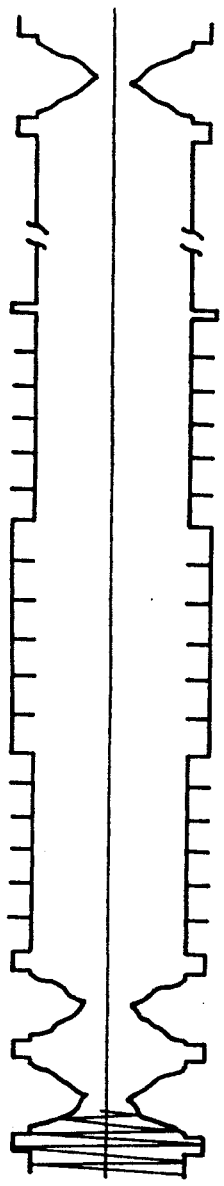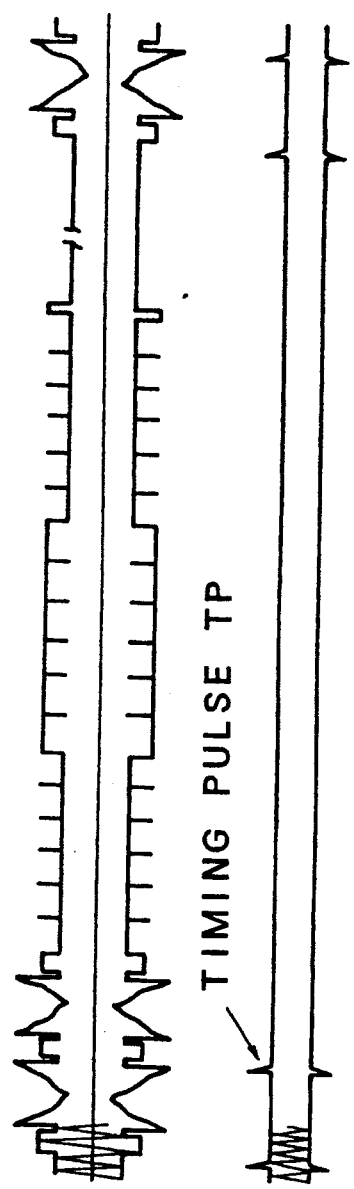
FIG. 1A
FIG. 1B
FIG. 1C
FIG. 1D

METHOD AND APPARATUS FOR DETECTING TIMING PULSES FOR SCRAMBLED TELEVISION SYSTEM

BACKGROUND OF THE INVENTION

1. Field of the Invention

The present invention relates to a method and apparatus for detecting timing pulses for a scrambled television system and, more particularly, to a method and circuit arrangement for detecting timing pulses for descrambling a scrambled television signal, which is transmitted to subscribers through a CATV (Cable Television) system, a civil satellite television broadcasting system, or the like, in order to permit only the contracting subscribers to receive the scrambled television signal in normal condition.

2. Description of the Prior Art

In a CATV system and a satellite broadcasting system, it is common to scramble a television signal in order to disturb television pictures, so that only the contracting television subscribers are able to receive television programs by implementing a proper descrambling operation at the receiving end.

In case of a CATV system, to scramble the television signal, the synchronizing signal of the television signal is suppressed at an interval, for example, of every fifteen-frames with different rates of suppression for asynchronizing the television system at the receiving end.

As shown in FIGS. 1A-1D, in a CATV center at the transmitting end, a base band television signal (FIG. 1A) is converted into a television intermediate frequency (IF) signal (FIG. 1B), horizontal synchronizing intervals and vertical blanking intervals (VBI) including blanking intervals of a video signal are suppression at the same rate of suppression (FIG. 1C). The obtained television signal is in turn sent out after multiplexing timing pulses (TP), which include data relating to the rate of compression, on a frequency modulated (FM) sound IF signal through amplitude modulation (AM) in synchrony with a positive going edge of each horizontal synchronizing interval of the television signal (FIG. 1D).

The compression data are decoded in a CATV terminal unit at the receiving end based on the received timing pulses, whereby stretching the horizontal synchronizing intervals of the received television signal, which was compressed at the transmitting end, by utilizing amplitude stretching data obtained from the decoded compression data for providing normal pictures on a display screen for viewing.

Now referring to FIG. 2, there is shown a block diagram illustrating the operation of the CATV terminal unit, wherein the scrambled IF signal amplified at an IF amplifier circuit 20 is filtered by a band pass filter 21, which consists of a SAW (surface acoustic wave) filter, for emphasizing a video carrier wave and sound carrier wave, and then an FM inter-carrier signal of 4.5 MHz sound signal is derived from a video detector circuit 22.

The FM sound signal is in turn filtered by a 4.5 MHz±250 KHz band pass filter BPF 23, and fed to an AM detector circuit 24 to produce the timing pulses (TP) which have been multiplexed on the FM sound signal by amplitude modulation at the transmitting end. The timing pulses (TP) thus produce are then fed to a descrambler circuit 25.

At the descrambler circuit 25, data relating to the rate of suppression contained in the timing pulses (TP) is detected and then data relating to a rate of restoration is generated in such a timing as being synchronized with the timing pulses (TP), thus restoring the horizontal synchronizing intervals and vertical blanking intervals, which have been suppressed at the transmitting end, to that of the unscrambled television IF signal by restoring them to respective amplitudes in accordance with the rate of restoration as in U.S. Pat. No. 4,567,517.

However, in accordance with the aforementioned inter-carrier system, the mixing of a component part of a video signal with the sound signal is unavoidable, and there have been such problems that the timing pulses (TP) are hardly detected in a produced beat signal of 4.5 MHz due to mutual interference of the modulated video and sound signals contained therein.

Further, in recent years, there are several different types of broadcasting systems such as a bilingual broadcasting, stereophonic broadcasting and the like wherein an auxiliary sound signal carrier wave $F_N$ is located in close range (approximately 224-350 KHz) to a main sound signal carrier wave $F_A$ by multiplexing. These broadcasting system also have problems such that, in accordance with a simple inter-carrier system, the video signal carrier wave $F_V$, the main sound signal carrier wave $F_A$ and the auxiliary sound signal carrier wave $F_N$ may cause interferences with each other and this makes hard to detect the timing pulses correctly. It is also difficult to separate the main sound signal carrier wave $F_A$ from the auxiliary sound signal carrier wave $F_N$ as they are located so close to each other in frequency.

It is therefore an object of this invention to provide a method and apparatus for detecting timing pulses for use in descrambling, wherein detected are the timing pulses, with high accuracy, contained in a scrambled television signal as multiplexed on a main sound signal through an amplitude modulation.

SUMMARY OF THE INVENTION

A method for detecting timing pulses for use in descrambling in accordance with this invention comprises the steps of, separating a video IF signal and a sound IF signal from a scrambled television IF signal by utilizing different filters, generating a video carrier wave which is synchronized with the separated video IF signal, deriving a main sound IF signal from a beat signal which is obtained by mixing the generated video carrier wave with the separated sound IF signal, and detecting the timing pulses for use in descrambling through an AM demodulation of the derived main sound IF signal.

An apparatus for detecting timing pulses for use in descrambling in accordance with this invention comprises a first filter circuit for separating a video IF signal from a scrambled television IF signal, a second filter circuit for separating a sound IF signal from the scrambled television IF signal, a PLL (phase-locked loop) circuit for generating a local oscillation signal of video carrier frequency in synchrony with the separated video IF signal, a mixer circuit for outputting a beat signal of difference by mixing the sound IF signal separated by the second filter circuit with the local oscillation signal fed by the PLL circuit, a third filter circuit for separating the main sound IF signal from the beat signal fed from the mixer circuit, and an AM demodulator circuit for detecting timing pulses multiplexed on the main sound IF signal through an AM modulation.

In accordance with this invention, when a scrambled television signal is received, a video IF signal is separated by the first filter circuit and a sound IF signal is separated by the second filter circuit. The video IF signal separated by the first filter is then fed to the PLL circuit, wherein the video IF signal is phase detected by a video carrier wave oscillated by a voltage-controlled oscillator (VCO), a detected error signal is then fed back to the VCO for generating a local oscillation signal or the video carrier wave $F_v$ synchronized in phase with the input video IF signal.

The video carrier wave $F_v$ generated at the PLL circuit is in turn mixed with the sound IF signal separated by the second filter circuit and converted into a beat signal having a frequency of 4.5 MHz. Since the main sound IF signal and auxiliary sound IF signal are included in this beat signal, only the main sound IF signal is separated from the beat signal by attenuating the auxiliary sound IF signal by making use of a third filter circuit.

Further, the timing pulses multiplexed on the main sound IF signal in accordance with the AM modulation are demodulated at the AM demodulator and fed to the descrambler circuit. At the descrambler circuit, generating the restoring data by decoding the compression data contained in the timing pulses and restoring the scrambled television IF signal to the original television IF signal by restoring the synchronizing signal intervals suppressed at the transmitting end.

BRIEF DESCRIPTION OF THE DRAWINGS

FIGS. 1A-1D are waveform diagrams for illustrating a method of scrambling in accordance with this invention;

DETAILED DESCRIPTION OF THE PREFERRED EMBODIMENT

Figure 2:
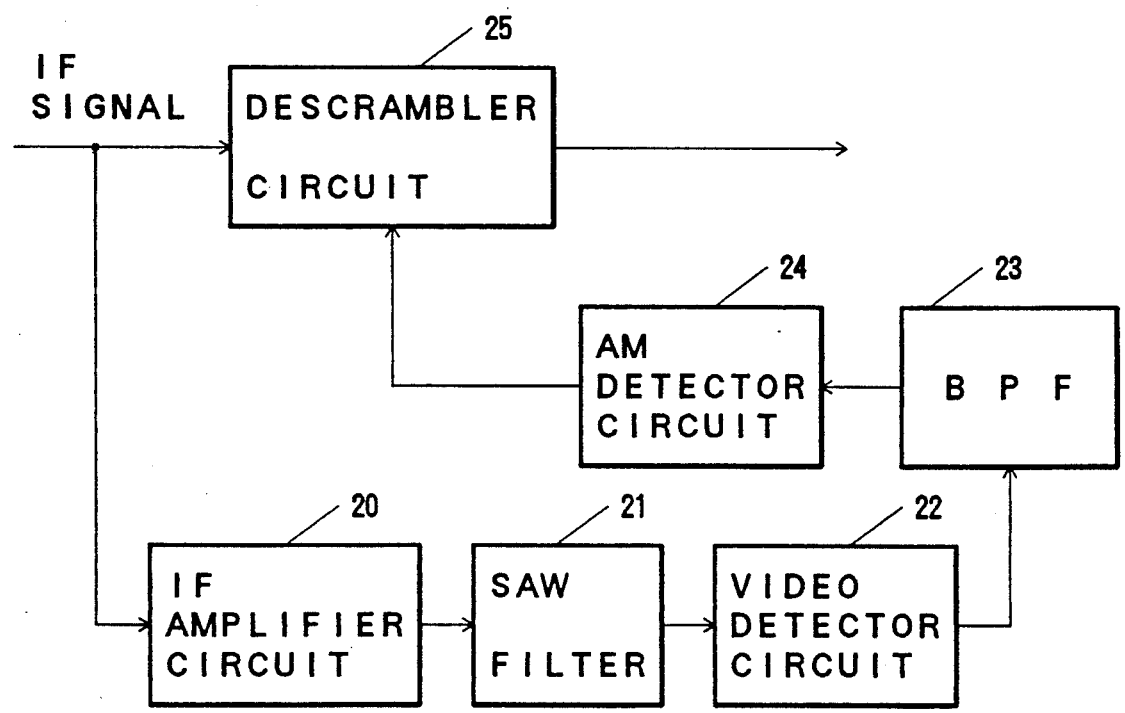
FIG. 2 is a block diagram showing a timing pulse detecting apparatus of prior art.
Figure 3:
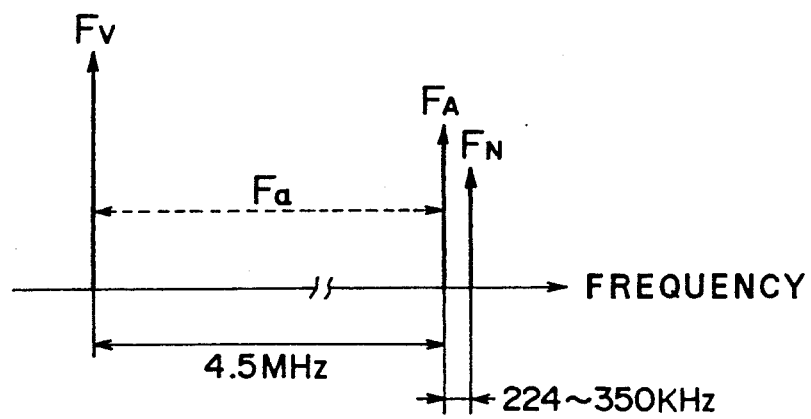
FIG. 3 is a diagram showing relations between signal frequencies contained in an input IF signal.
Figure 4:
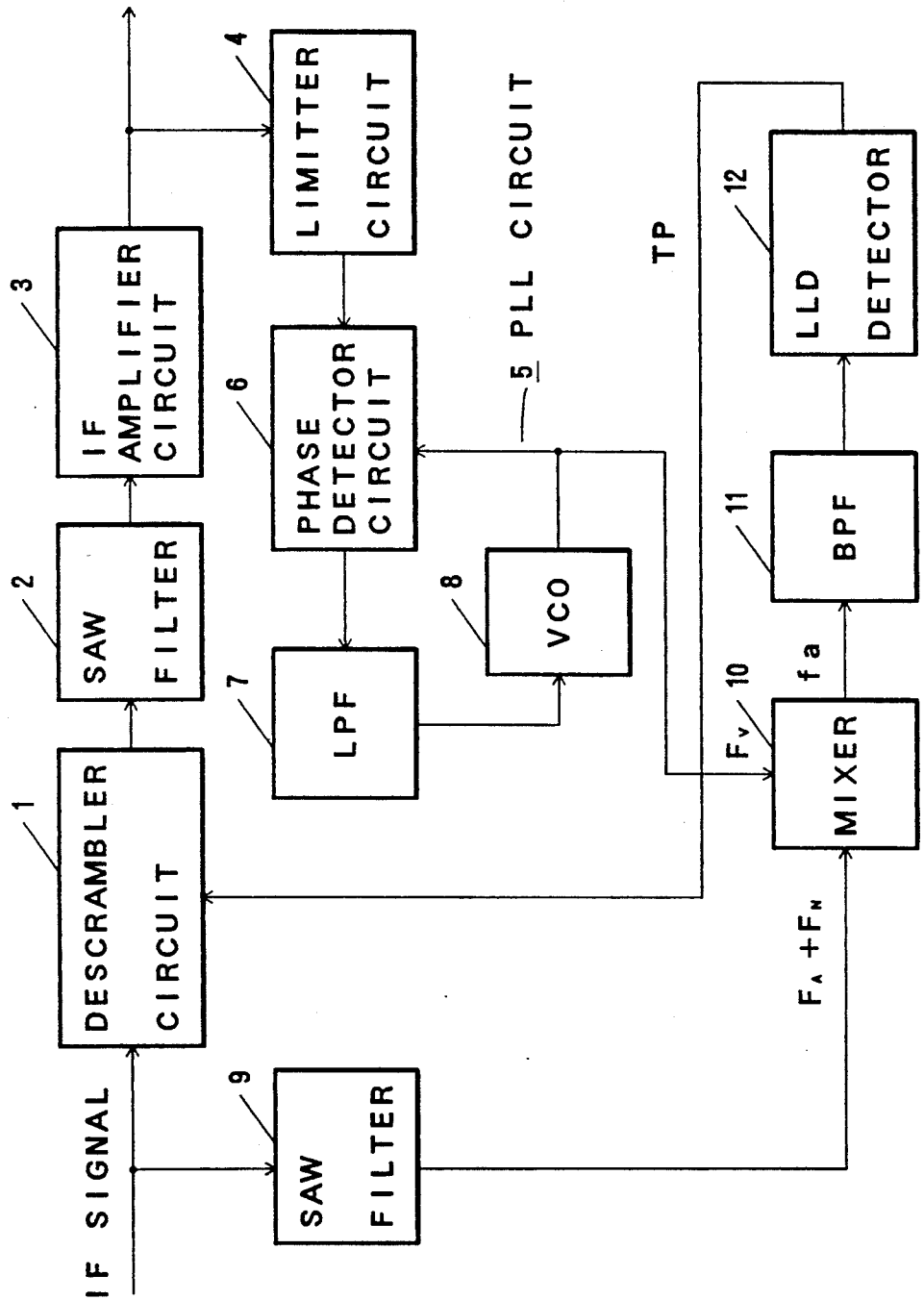
FIG. 4 is a block diagram showing an embodiment of this invention.

One preferred embodiment of this invention will now be described by referring to the attached drawings. FIG. 4 is a block diagram illustrating a method of this invention and an apparatus for detecting timing pulses for use in descrambling a received scrambled television signal. Timing pulses TP bearing suppression rate data, multiplexed on a main sound FM signal by way of an amplitude modulation, are detected from a television IF signal which contains a main sound carrier wave $F_A$ and an auxiliary sound carrier wave $F_N$.

This embodiment comprises a descrambler circuit 1 for restoring the scrambled input television IF signal to the original unscrambled television IF signal through the descrambling process, a SAW filter 2 for separating a video IF signal from an output of the descrambler circuit 1, an IF amplifier circuit 3 for amplifying the video IF signal separated by the SAW filter 2, a limiter circuit 4 for passing only the video IF signal carrier wave from an output of the IF amplifier circuit 3, and a PLL circuit 5 to which an output of the limiter circuit 4 is fed.

The PLL circuit 5 consists of a loop circuit made up of a phase detector circuit 6 to receive the video IF signal passed through the limiter circuit 4, a LPF (low-pass filter) 7, and a VCO (voltage-controlled oscillator) 8.

This preferred embodiment further comprises a SAW filter 9 for separating a sound IF signal from the scrambled input IF signal, a mixer circuit 10 for extracting a beat signal $f_a$ (4.5 MHz) having a frequency equal to the difference between the sound IF signal fed from the SAW filter 9 and the video carrier wave $F_v$ fed from the PLL circuit, a BPF (band-pass filter) 11 for extracting only the main sound IF signal from the beat signal $f_a$, and an LLD (low-level detector) circuit 12 for deriving the timing pulses TP through an AM detection from the main sound IF signal separated by the BPF 11, wherein the timing pulses TP detected by the LLD circuit 12 are fed to the descrambler circuit 1. The BPF 11 consists of a ceramic filter having a band-width of 4.5 MH±100 KHz for passing only the main sound IF signal by attenuating the auxiliary sound IF signal.

In the circuit arrangement having the configuration as described above, when the scrambled IF signal is fed to an input port, the video IF signal is passed through the SAW filter 2 whilst the sound IF signal is passed through the SAW filter 9. Only the video carrier wave of the video IF signal separated by the SAW filter 2 is fed to the PLL circuit 5 after being amplified by the IF amplifier circuit 3 and limited by the limiter circuit 4.

At the PLL circuit 5, the video carrier wave $F_v$ generated by the VCO 8 and the carrier wave of the received video IF signal fed by the limiter circuit 4 are compared in phase by the phase detector circuit 6, and thereby a detected error signal is fed back to the VCO 8 through the LPF 7 for generating a local oscillation signal (video carrier wave signal $F_v$) synchronized with the carrier wave of the received video IF signal.

The video carrier wave $F_v$ generated by the PLL circuit 5 is then mixed at the mixer circuit 10 with the sound IF signal separated by the SAW filter 9 to derive the beat signal $f_a$ having the frequency of 4.5 MHz from the mixer circuit 10. Since this beat signal $f_a$ contains the main FM sound signal and auxiliary FM sound signal, the auxiliary sound IF signal is attenuated by the ceramic filter BPF 11 to pass only the main sound IF signal.

Next, the timing pulses TP multiplexed on the main sound IF signal by the amplitude modulation are detected by the LLD circuit 12, and the detected timing pulses TP are then fed to the descrambler circuit 1. At the descrambler circuit 1, the suppression data contained in the timing pulses are decoded and the synchronizing signal intervals suppressed at the transmitting end are restored in order to obtain a normal television signal based on amplitude restoring data which are obtained from the decoded data.

As it has been described above, the present invention has been embodied in the National Television System Committee (NTSC) color television system having the inter-carrier frequency of 4.5 MHz, however, it is apparent to those skilled in the art that the present invention can be embodied in different broadcasting systems such as, for example, the Phase Alteration by Line (PAL)-I color television system, the PAL-B/G color television system, the stereophonic broadcasting system in Germany and Korea, and the like.

In accordance with the present invention, since the video carrier wave $F_v$ derived from the PLL circuit is different from the prior art inter-carrier system, it is possible to output a beat signal $f_a$ having a high S/N ratio with no interference from an AM modulation of the video signal for providing the descrambler circuit, for certainty, with the timing pulses which are multiplexed on the FM sound signal by way of the AM modulation.

Further, even in a television system with sound multiplex system wherein an auxiliary sound signal is multiplexed in close to the main sound signal, it is possible to detect the timing pulses multiplexed on the main sound signal with certainty for providing a definite descrambling at the receiving end.

In the foregoing specification, the invention has been described with reference to a specific exemplary embodiment thereof. It will, however, be apparent that various modification and changes may be made thereonto without departing from the spirit and scope of the invention as set forth in the appended claims. the specification and drawings are, accordingly, to be regarded in an illustrative rather than a restrictive sense.

What is claimed is:

1. An apparatus for detecting timing pulses for descrambling a scrambled intermediate frequency (IF) television signal having at least a video IF signal component, a sound IF signal component, and timing pulses amplitude modulated (AM) on said sound IF signal, the apparatus comprising:
    a first filter circuit for separating a video IF signal from a scrambled television IF signal through a descrambler circuit;
    a second filter circuit for separating a sound IF signal from the scrambled television IF signal;
    a PLL (phase-locked loop) circuit for generating a local oscillation signal having a video carrier frequency in synchrony with the separated video IF signal;
    a mixer circuit for outputting a beat signal by mixing the sound IF signal separated by the second filter circuit with the local oscillation signal generated by the PLL circuit;
    a third filter circuit for separating a main sound IF signal from the beat signal output by the mixer circuit; and
    an AM demodulator circuit for demodulating timing pulses from the main sound IF signal, whereby the timing pulse is fed to the descrambler circuit and thereby the scrambled television IF signal is descrambled.

2. An apparatus as set forth in claim 1, wherein said descrambler circuit receives the demodulated timing pulses from said AM demodulator circuit and outputs a descrambled television signal in accordance therewith.

3. An apparatus as set forth in claim 1, wherein said third filter circuit consists of a ceramic filter having a bandwidth of ±100 KHz.

4. An apparatus as set forth in claim 1, wherein said AM demodulator circuit is a LLD (low level detector) circuit.

5. A method for detecting timing pulses for descrambling a scrambled intermediate frequency (IF) television signal having a video IF signal component, a sound IF signal component, and timing pulses modulated on said sound IF signal, the method comprising the steps of:
    separating a video IF signal and a sound IF signal from the scrambled television IF signal;
    generating a video carrier wave which is synchronized with the separated video IF signal;
    extracting a main sound IF signal from a beat signal generated by mixing the video carrier wave with the separated sound IF signal; and
    detecting the timing pulses, and descrambling the scrambled television IF signal by using the timing pulses and through AM demodulation of the main sound IF signal.

6. A method as set forth in claim 5, further including the steps of:
    detecting a phase difference between the separated video IF signal and the video carrier wave oscillated by a voltage-controlled oscillator (VCO); and
    feeding a detected error signal back to the VCO for generating a locally oscillated video carrier wave Fv synchronized in phase with the video IF signal.

7. A method as set forth in claim 6, further including the steps of:
    extracting the main sound IF signal and a auxiliary sound IF signal from the beat signal having the frequency of 4.5 MHz generated by mixing the video carrier wave Fv with the separated sound IF signal; and
    separating the main sound IF signal from the auxiliary sound IF signal by attenuating the auxiliary sound IF signal with a filter circuit.

8. A method as set forth in claim 5, further including the steps of:
    restoring synchronizing signal intervals suppressed at a transmitting end in accordance with restoring data obtained by decoding data contained in the timing pulses; and
    restoring the scrambled television IF signal to an unscrambled state.

* * * * *